US 8,085,339 B2
Dec. 27, 2011

(54) METHOD AND APPARATUS FOR OPTIMIZING CAPTURE DEVICE SETTINGS THROUGH DEPTH INFORMATION (75) Inventor: Richard L. Marks, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/646,938

(22) Filed: Dec. 23, 2009

(65) Prior Publication Data

US 2010/0097476 A1   Apr. 22, 2010

Related U.S. Application Data (63) Continuation of application No. 10/758,817, filed on Jan. 16, 2004, now Pat. No. 7,663,689.

(51) Int. Cl.
*H04N 5/235* (2006.01)
(52) U.S. Cl. ............ 348/362; 348/229.1; 348/347; 348/370
(58) Field of Classification Search .......... 348/370, 348/347, 208.12, 208.14, 229.1, 231.6, 345, 348/352, 362, 363, 364; 345/501–503, 522
See application file for complete search history.

(56) References Cited

U.S. PATENT DOCUMENTS

| 4,902,115 A * | 2/1990 | Takahashi ............ 359/362 |
| 5,394,168 A | 2/1995 | Smith, III et al. ............ 345/156 |
| 5,473,701 A | 12/1995 | Cezanne et al. ............ 381/92 |
| 5,485,273 A | 1/1996 | Mark et al. ............ 356/350 |
| 5,611,731 A | 3/1997 | Bouton et al. ............ 463/37 |
| 5,675,825 A | 10/1997 | Dreyer et al. ............ 395/800 |
| 5,841,447 A * | 11/1998 | Drews ............ 345/563 |
| 5,846,086 A | 12/1998 | Bizzi et al. ............ 434/247 |
| 5,861,910 A | 1/1999 | McGarry et al. ............ 348/87 |
| 5,877,809 A * | 3/1999 | Omata et al. ............ 348/345 |
| 5,930,741 A | 7/1999 | Kramer ............ 702/153 |
| 5,937,081 A | 8/1999 | O'Brill et al. ............ 382/111 |
| 5,959,596 A | 9/1999 | McCarten et al. ............ 345/2 |
| 6,144,367 A | 11/2000 | Berstis ............ 345/158 |

(Continued)

FOREIGN PATENT DOCUMENTS

EP   0835676   4/1998

(Continued)

OTHER PUBLICATIONS

Ephraim et al. "Speech Enhancement Using a Minimum Mean-Square Error Log-Spectral Amplitude Estimator", 1985, IEEE.

(Continued)

*Primary Examiner* — Tuan Ho
*Assistant Examiner* — Kent Wang
(74) *Attorney, Agent, or Firm* — Martine Penilla Group, LLP (57) ABSTRACT

A method for adjusting image capture settings for an image capture device is provided. The method initiates with capturing depth information of a scene at the image capture device. Depth regions are identified based on the captured depth information. Then, an image capture setting is adjusted independently for each of the depth regions. An image of the scene is captured with the image capture device, wherein the image capture setting is applied to each of the depth regions when the image of the scene is captured.

14 Claims, 8 Drawing Sheets

U.S. PATENT DOCUMENTS

| | | | | |
|---|---|---|---|---|
| 6,314,203 B1* | 11/2001 | Mikuni | | 382/167 |
| 6,498,860 B1 | 12/2002 | Sasaki et al. | | 382/103 |
| 6,533,420 B1 | 3/2003 | Eichenlaub | | 353/7 |
| 6,587,573 B1 | 7/2003 | Stam et al. | | 382/104 |
| 6,674,415 B2 | 1/2004 | Nakamura et al. | | 345/32 |
| 6,727,988 B2 | 4/2004 | Kim et al. | | 356/319 |
| 6,741,741 B2 | 5/2004 | Farrell | | 382/199 |
| 6,746,124 B2 | 6/2004 | Fischer et al. | | 353/43 |
| 6,765,618 B1* | 7/2004 | Sato | | 348/348 |
| 6,772,057 B2 | 8/2004 | Breed et al. | | 701/45 |
| 6,791,531 B1 | 9/2004 | Johnston et al. | | 345/157 |
| 6,928,180 B2 | 8/2005 | Stam et al. | | 382/104 |
| 6,956,612 B2* | 10/2005 | Bean et al. | | 348/345 |
| 6,990,639 B2 | 1/2006 | Wilson | | 715/863 |
| 7,043,056 B2 | 5/2006 | Edwards et al. | | 382/103 |
| 7,084,901 B2* | 8/2006 | Smith | | 348/143 |
| 7,223,173 B2 | 5/2007 | Masuyama et al. | | 463/36 |
| 7,263,462 B2 | 8/2007 | Funge et al. | | 702/179 |
| 7,296,007 B1 | 11/2007 | Funge et al. | | 706/47 |
| 7,352,359 B2 | 4/2008 | Zalewski et al. | | 345/156 |
| 7,391,409 B2 | 6/2008 | Zalewski et al. | | 345/156 |
| 7,436,887 B2 | 10/2008 | Yeredor et al. | | 375/240 |
| 7,545,926 B2 | 6/2009 | Mao | | 379/406.08 |
| 7,558,698 B2 | 7/2009 | Funge et al. | | 702/179 |
| 7,613,610 B1 | 11/2009 | Zimmerman et al. | | 704/235 |
| 7,623,115 B2 | 11/2009 | Marks | | 345/156 |
| 7,627,139 B2 | 12/2009 | Marks et al. | | 382/103 |
| 7,636,645 B1 | 12/2009 | Yen et al. | | 702/152 |
| 7,663,689 B2* | 2/2010 | Marks | | 348/370 |
| 7,697,700 B2 | 4/2010 | Mao | | 381/94.3 |
| 7,721,231 B2 | 5/2010 | Wilson | | 715/863 |
| 2003/0022716 A1 | 1/2003 | Park et al. | | 463/36 |
| 2003/0122942 A1* | 7/2003 | Parker et al. | | 348/231.3 |
| 2004/0057613 A1* | 3/2004 | Noto et al. | | 382/154 |
| 2004/0155962 A1* | 8/2004 | Marks | | 348/143 |
| 2004/0178576 A1 | 9/2004 | Hillis et al. | | 273/148 |
| 2004/0227725 A1 | 11/2004 | Calarco et al. | | 345/156 |
| 2005/0226431 A1 | 10/2005 | Mao | | 381/61 |
| 2006/0038819 A1 | 2/2006 | Festejo et al. | | 345/530 |
| 2006/0204012 A1 | 9/2006 | Marks et al. | | 381/26 |
| 2006/0233389 A1 | 10/2006 | Mao et al. | | 381/92 |
| 2006/0252541 A1 | 11/2006 | Zalewski et al. | | 463/156 |
| 2006/0256081 A1 | 11/2006 | Zalewski et al. | | 345/156 |
| 2006/0264258 A1 | 11/2006 | Zalewski et al. | | 463/36 |
| 2006/0264259 A1 | 11/2006 | Zalewski et al. | | 463/36 |
| 2006/0264260 A1 | 11/2006 | Zalewski et al. | | 463/36 |
| 2006/0269072 A1 | 11/2006 | Mao | | 381/56 |
| 2006/0269073 A1 | 11/2006 | Mao | | 381/56 |
| 2006/0274032 A1 | 12/2006 | Mao et al. | | 345/156 |
| 2006/0274911 A1 | 12/2006 | Mao et al. | | 381/334 |
| 2006/0280312 A1 | 12/2006 | Mao | | 381/56 |
| 2006/0282873 A1 | 12/2006 | Zalewski et al. | | 725/133 |
| 2006/0287084 A1 | 12/2006 | Mao et al. | | 463/37 |
| 2006/0287085 A1 | 12/2006 | Mao et al. | | 463/37 |
| 2006/0287086 A1 | 12/2006 | Zalewski et al. | | 436/37 |
| 2006/0287087 A1 | 12/2006 | Zalewski et al. | | 463/37 |
| 2007/0015559 A1 | 1/2007 | Zalewski et al. | | 463/1 |
| 2007/0021208 A1 | 1/2007 | Mao et al. | | 463/36 |
| 2007/0025562 A1 | 2/2007 | Zalewski et al. | | 381/92 |
| 2007/0061413 A1 | 3/2007 | Larsen et al. | | 709/217 |
| 2007/0072675 A1 | 3/2007 | Hammano et al. | | 463/42 |
| 2007/0260340 A1 | 11/2007 | Mao | | 700/94 |
| 2007/0260517 A1 | 11/2007 | Zalewski et al. | | 705/14 |
| 2007/0261077 A1 | 11/2007 | Zalewski et al. | | 725/35 |
| 2008/0091421 A1 | 4/2008 | Gustavsson | | 704/233 |
| 2009/0010494 A1 | 1/2009 | Bechtel et al. | | 382/104 |
| 2009/0016642 A1 | 1/2009 | Hart | | 382/278 |
| 2009/0221368 A1 | 9/2009 | Yen et al. | | 463/32 |
| 2009/0221374 A1 | 9/2009 | Yen et al. | | 463/42 |
| 2009/0288064 A1 | 11/2009 | Yen et al. | | 717/106 |
| 2010/0004896 A1 | 1/2010 | Yen et al. | | 702/153 |
| 2010/0033618 A1* | 2/2010 | Wong et al. | | 348/347 |
| 2010/0137064 A1 | 6/2010 | Shum et al. | | 463/36 |

FOREIGN PATENT DOCUMENTS

| | | |
|---|---|---|
| EP | 1098686 | 5/2003 |
| WO | WO 88/05942 | 8/1988 |
| WO | WO 98/48571 | 10/1998 |
| WO | WO 2008/056180 | 5/2008 |

OTHER PUBLICATIONS

Ephraim et al. "Speech Enhancement Using a Minimum Mean-Square Error Short-Time Spectral Amplitude Estimator", 1984, IEEE.

Richardson et al. "Virtual Network Computing", 1998, IEEE Internet Computing vol. 2.

XP-002453974, "CFS and FS95/98/2000: How to Use the Trim Controls to Keep Your Aircraft Level", Aug. 10, 2007, http://support.microsoft.com/?scid=kb%3Ben-us%3B175195&x=13&y=15.

* cited by examiner

METHOD AND APPARATUS FOR OPTIMIZING CAPTURE DEVICE SETTINGS THROUGH DEPTH INFORMATION

CROSS REFERENCE TO RELATED APPLICATIONS

This application is a continuation of, and claims priority to, U.S. patent application Ser. No. 10/758,817 filed on Jan. 16, 2004 now U.S. Pat. No. 7,663,689, entitled "METHOD AND APPARATUS FOR OPTIMIZING CAPTURE DEVICE SETTINGS THROUGH DEPTH INFORMATION," the disclosure of which is herein incorporated by reference in its entirety. This application is related to U.S. patent application Ser. No. 10/365,120 filed on Feb. 11, 2003 and entitled "METHOD AND APPARATUS FOR REAL TIME MOTION CAPTURE," the disclosure of which is herein incorporated by reference in its entirety for all purposes.

BACKGROUND OF THE INVENTION

1. Field of the Invention

This invention relates generally to image capture techniques, and more particularly to enhancing a captured image of a scene by adjustments enabled through depth information.

2. Description of the Related Art

Image capture devices, whether cameras or video based devices, typically have a limited contrast ratio, which is a measure of the difference between the darkest and lightest parts of a scene. One exemplary scene may include a person in the shade and the background having bright sunlight. When the background of this scene is exposed correctly for the image capture device, there is little or no detail in the shaded person's face.

Auto-exposure and auto-gain features are commonly used to set brightness levels for the capture device. These features tend to take the entire scene and average it to apply a certain exposure or gain setting. While the averaging may work well for a scene having a great deal of images and colors, this scheme quickly breaks down as the scene has less variety.

One attempt to address the limited contrast ratio of current capture devices is through the use of a backlight feature. For instance, where there is a bright light source in the background, e.g., sunlight, backlight compensation will take the center of the scene and use that region as the average. By doing this, the center of the scene may be brightened while the bright sunlight on the edges becomes washed out or darkened. The shortcoming with backlight compensation is that the object to be brightened must be in the center of the scene. In addition, a region of the scene is used for computing the average, rather than the actual object itself, which may cause some display artifacts. Furthermore, backlight compensation does not provide a solution where there are multiple foreground images in different regions of the scene. Additionally, with backlight compensation, the foreground object is brightened, however, this is done at the expense of the detail in the background. Thus, a user is required to choose between foreground detail and background detail. Some of these shortcomings may be extended to video capture devices which may be used for interactive entertainment applications. For example, where an image of a user is incorporated into a video game, a bright light source may adversely the displayed image as described above. This adverse impact may prevent the tracking of an object of the image in addition to displaying a poor quality image.

Accordingly, there is a need to solve the problems of the prior art to provide a system and method for producing an image that has the exposure/gain and other related parameters adjusted for both the foreground and background.

SUMMARY OF THE INVENTION

Broadly speaking, the present invention fills these needs by providing a method and system that enables adjustment of segments of a scene, e.g., foreground and background images, where the foreground and background images are identified through a depth mask. It should be appreciated that the present invention can be implemented in numerous ways, including as a process, a system, or a device. Several inventive embodiments of the present invention are described below.

In one embodiment, a method for differentiating between foreground objects and background objects within a scene being captured through an image capture device is provided. The method initiates with emitting a ray of light from a light source toward an object of the scene. The method includes opening an aperture cover allowing access to a sensor of the image capture device for reflected light from the light source. Then, the aperture cover is closed after a predefined time, where the predefined amount of time corresponds to a maximum distance traveled by the light. Next, a depth mask identifying objects within a foreground region of the scene is generated based upon the light captured during the predefined time. Then, image capture device parameters are adjusted according to bit values of the depth mask prior to capturing a subsequent corresponding image of the scene.

In another embodiment, a method for adjusting image capture settings for an image capture device is provided. The method initiates with identifying a scene. Then, an image of the scene is captured. The method includes generating a depth mask of the scene from data defining the image of the scene. Then, pixel values corresponding to objects within any one or both of a foreground region and a background region of the captured image are adjusted based upon bit values of the depth mask.

In yet another embodiment, an image capture device configured to capture an image of a scene is provided. The image capture device includes depth logic configured to provide a depth mask associated with the scene. The depth mask is configured to distinguish between foreground objects and background objects within the scene. The image capture device also includes image capture logic configured to adjust a characteristic associated with the image based upon a corresponding bit value of the depth mask. The bit value determines whether the respective pixel is associated with one of the foreground objects and the background objects.

In still yet another embodiment, a system is provided. The system includes a computing device and a display screen in communication with the computing device. The display screen is configured to display an image of a scene. A video capture device in communication with the computing device is included. The video capture device provides scene image data to the computing device for presentation on the display screen. The video capture device includes depth logic and image capture logic. The depth logic is configured to provide a depth mask associated with the scene. The depth mask is configured to distinguish between foreground objects and background objects within the scene. The image capture logic is configured to adjust a characteristic associated with each pixel of the image data based upon corresponding data of the depth mask. The data of the depth mask determines a relative distance between an object associated with the corresponding pixel and the video capture device.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION OF THE PREFERRED EMBODIMENTS

An invention is disclosed for a system and method for differentiating between foreground and background objects of a scene and subsequently adjusting image or video characteristics based upon whether the objects are located in the foreground or background. Alternatively, the image or video characteristics may be adjusted based upon the relative distance between the objects and the image capture device. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

The embodiments of the present invention provide a method and system that eliminates the user from having to choose between foreground and background objects of a scene. Through the use of depth information, the scene may be segmented into regions of different depths. In addition, the depth information allows for the definition of an exact outline of the image, thereby providing a specific and accurate mechanism for controlling image capture device parameters, e.g., exposure/gain/brightness/gain and focus. The segmentation based upon depth information makes it possible to assign different parameter values to different pixel regions for a digital capture device. Thus, an image having the exposure/gain adjusted properly for both the foreground and background is enabled through the embodiments described below. The segmentation based upon depth is captured through a foreground/background depth mask which may be created through an image capture device having depth capability or through a light pulse/flash with a time of flight cut-off technique, both discussed in more detail below.

Figure 1:
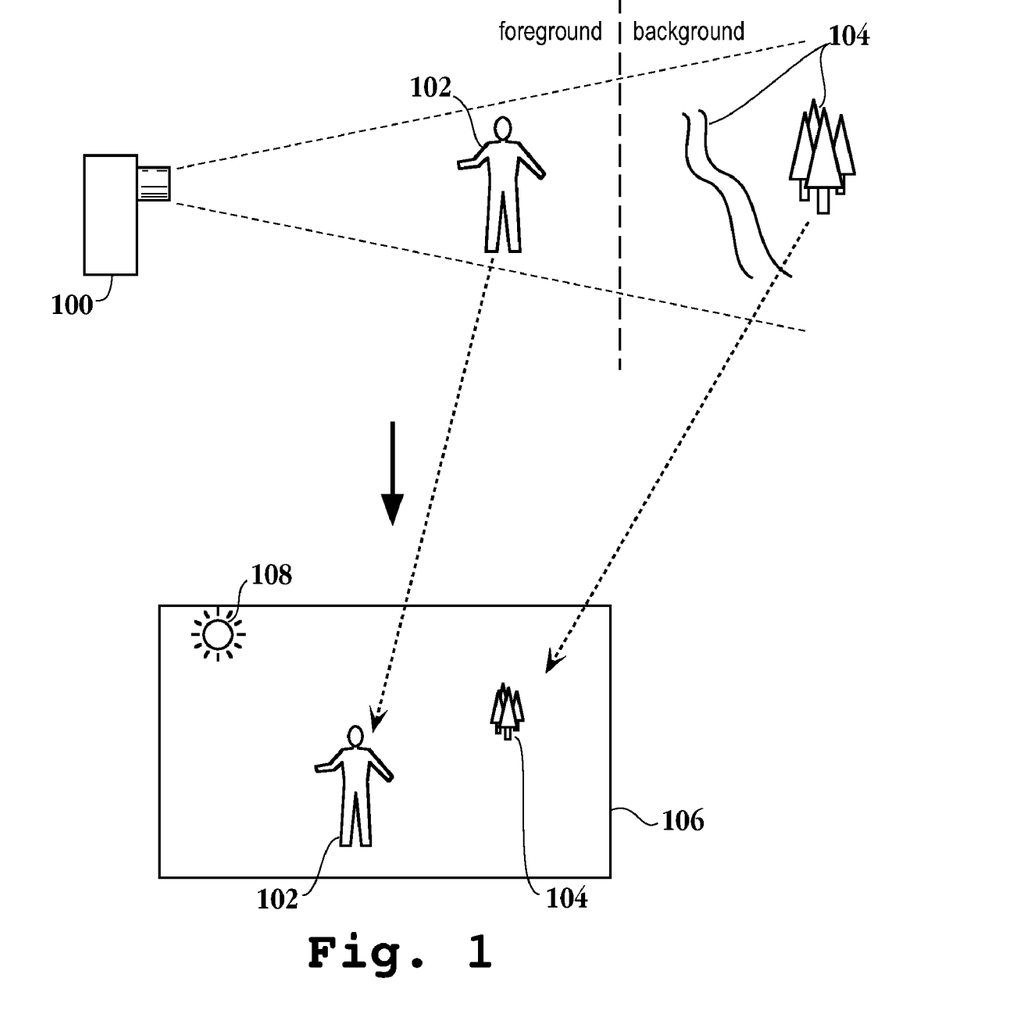
FIG. 1 is a simplified schematic diagram illustrating a scene having foreground and background objects, which is captured through an image capture device and subsequently displayed in accordance with one embodiment of the invention.

FIG. 1 is a simplified schematic diagram illustrating a scene having foreground and background objects which is captured through an image capture device and subsequently displayed in accordance with one embodiment of the invention. Image capture device 100 is configured to capture an image of a scene in which a person 102 is in the foreground and background scenery 104. The captured image of the scene is then displayed on display panel 106. Display panel 106 may be a display panel affixed to image capture device 100, e.g., a liquid crystal display (LCD) panel where the image capture device is a digital camera or camcorder. Alternatively, display panel 106 may be remote from image captures device 100, e.g., a television screen where the image capture device is a webcam used in conjunction with a computing device, such as a game console. As will be described in more detail below, foreground image 102 and background scenery 104 are capable of having their corresponding image or video characteristics independently compensated irrespective of their position in either the foreground or the background. While a single foreground image 102 is shown in FIG. 1, it should be appreciated that multiple foreground images may be captured. The image or video characteristics for each of the multiple foreground images may be independently adjusted based upon depth information. As used herein, image or video characteristics may refer to brightness, exposure, gain, focus and other suitable characteristics capable of being adjusted for image display. It should be appreciated that image or video characteristics may be referred to simply as characteristics and correspond to the inherent image data which improves the display quality of the image data through the embodiments described herein. Additionally, image capture device 100 may be a digital still camera, a single lens reflex camera, a video capture device, such as a web cam or camcorder, or any other suitable image capture device.

Image capture device 100, of FIG. 1, is capable of generating and utilizing a mask in order to identify objects as being within a foreground or background region as will be described in more detail below. This mask can then be used in order to compensate for the foreground and background regions, in order to provide a subsequent display which shows details for objects within both regions. For example, the use of backlight compensation to reduce the impact of a bright light source on the scene, such as sun 108, causes details to be defined for foreground objects, i.e., object 102, while the background images are washed out. While sun 108 is illustrated on display panel 106, it is shown for exemplary purposes and a scene need not include an actual image of the sun to be adversely impacted by the light originating from the sun. Without backlight compensation, foreground objects would be darkened and lose their corresponding detail in the resulting display. With the depth mask capability described in more detail below, the exact location of foreground and background and background objects in the scene may be determined. This location may be translated to a resulting image of the scene in order to manipulate corresponding pixel values to enhance the resulting image. In addition, image capture device settings, which include mechanical and electrical settings that affect the image or video characteristics of the resulting image, may be adjusted in order to provide optimized settings for the scene.

Where image capture device 100 is a video capture device, e.g., a web cam, the enhanced functionality enabled through the depth information provided by the mask may be applied to frames of the captured video in order to improve or enhance the image display. For example, where the video capture device is used to track an object or person subsequently incorporated into an interactive entertainment application, the mask may be applied to prevent difficulty encountered when tracking the object or person in the presence of a bright light source. With respect to a video game application in the home environment, such as the EYETOY™ application owned by the assignee, a user being tracked and incorporated into the video game may be positioned in front of a window. As explained below in more detail with reference to FIG. 4, if the window is allowing light from a bright light source through the window, then the user may become washed out and the window will become the focus of the capture device. It should be appreciated that backlight compensation techniques will not be effective here if the user is not in the center of the capture region.

Figure 2:
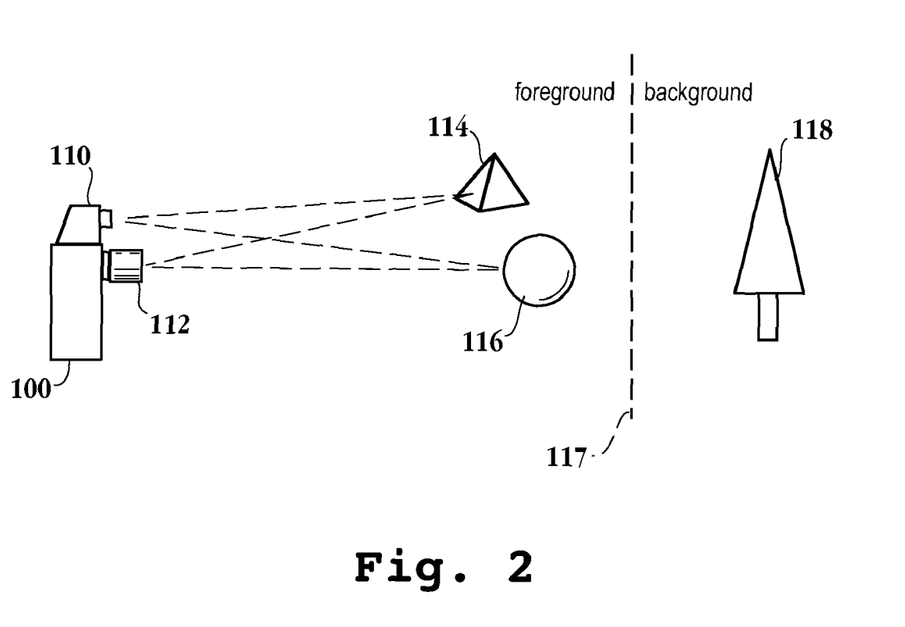
FIG. 2 is a simplified schematic diagram illustrating the generation of a depth mask for use in discerning between foreground and background objects in accordance with one embodiment of the invention.

FIG. 2 is a simplified schematic diagram illustrating the generation of a depth mask for use in discerning between foreground and background objects in accordance with one embodiment of the invention. It should be noted that the terms "depth mask" and "mask" are interchangeable as used herein and may include multiple depth layers. For example, the foreground and the background represent 2 depth layers, however, the scene may be segmented into more than two depth layers. Image capture device 100 includes light source 110. In one embodiment, light source 110 sends out a burst or pulse of light which is reflected by foreground objects 114 and 116. This reflected light is eventually captured by a sensor located behind lens 112 of image capture device 100. Of course, light source 110 may be a flash commonly used for cameras. One skilled in the art will appreciate that the sensor may be located anywhere on image capture device 100 that is capable of receiving the reflected light from the foreground objects within the scene for a defined time period.

As the speed of light is known, image capture device 100 of FIG. 2 may be configured to pulse the burst of light from light source 110 and open an aperture of image capture device 100 so that the reflected light from the foreground objects is received. The aperture will stay open for a predefined amount of time. The predefined amount of time is set so that light traveling from light source 110 and reflected back to image capture device 100, travels a defined maximum amount of distance. The maximum distance from image capture device 100 is illustrated as line 117. Therefore, any light which is reflected from a source past line 117 will not be received by image capture device as the aperture is closed prior to this reflected light reaching the sensor of the image capture device. Of course, the ambient light, i.e., the light not generated by the burst of light from the light source, is subtracted from the received light.

Various techniques may be used for the determining the foreground objects through the time of flight. One technique is through the use of a frequency of light not present in the ambient light. Alternatively, an image of the scene may be taken without the light on, then an image taken with the light from the light source. The light generated by the light source may then be determined by subtracting away the light not generated from the light source, i.e., the image taken without the light on, from the image taken with the light source. In yet another alternative, the amount of light reflected from the light source may be distinguished from ambient light by establishing a threshold of how much light must strike each pixel. Thus, a value which is less than the threshold would not be considered as light originating from the device and values greater than or equal to the threshold would be considered as originating from the light source of the device. Still yet another alternative that employs the use of a modulated light source. Here, the light from the light source is generated in a modulated format, e.g., a sine wave. The frequency chosen depends upon a range where no more than one period of the modulation covers the entire range from the light source and back to the device.

In one embodiment, the maximum amount of distance is defined as about four meters from the image capture device. From this data, a depth mask is created and stored in memory of the image capture device. This depth mask may then be used in conjunction with a simultaneous or subsequent captured image of the scene in order to compensate for the image or video characteristics for the foreground and background objects accordingly. It will be apparent to one skilled in the art that light source 110 may emit any suitable wavelength of light. In one embodiment, infrared light is emitted from light source 110.

In another embodiment, the depth mask defined through the reflected light is a binary bit mask. Here, a first logical value is assigned to locations in the mask associated with foreground images, while a second logical value is assigned to locations associated with background images. Thus, where image capture device 100 is a digital device, pixel data for an image associated with the depth mask may be manipulated to adjust the brightness of the foreground and background images. Where image capture device is a traditional camera, foreground and background images may be detected through the burst of light scheme described above. Based on the detection of the foreground and background images, the exposure, gain, brightness, focus, etc., settings of the camera may be adjusted prior to taking a picture of the scene. As mentioned above, the aperture size may be changed to manipulate the amount of light received by the image capture device. Of course, other mechanical and electrical settings may be adjusted where the mechanical or electrical settings impact the resulting photograph quality. Thus, both the foreground and background properties may be adjusted rather than having to choose between the foreground and the background.

Figure 3A:
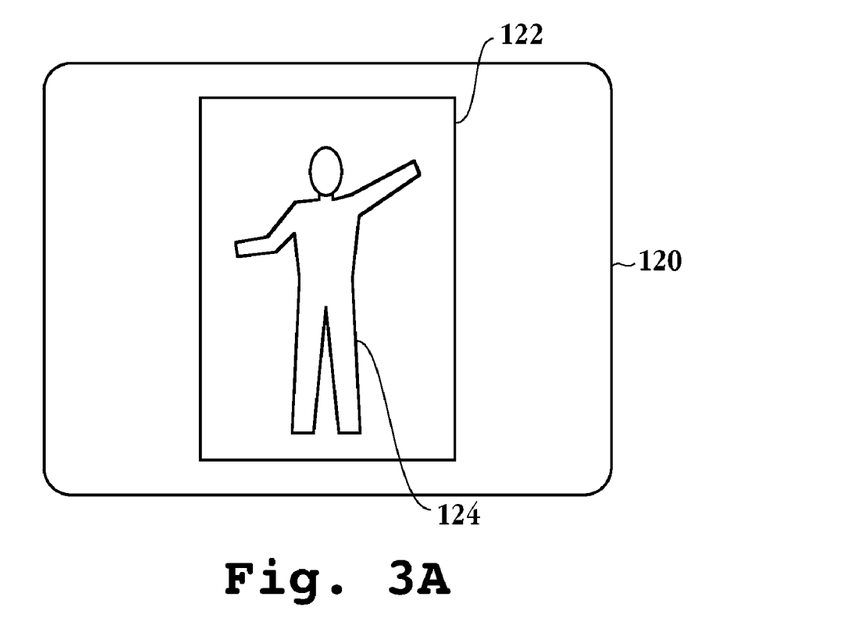
FIGS. 3A and 3B are simplified schematic diagrams illustrating the amount of detail enabled in defining foreground objects in accordance with one embodiment of the invention.
Figure 3B:
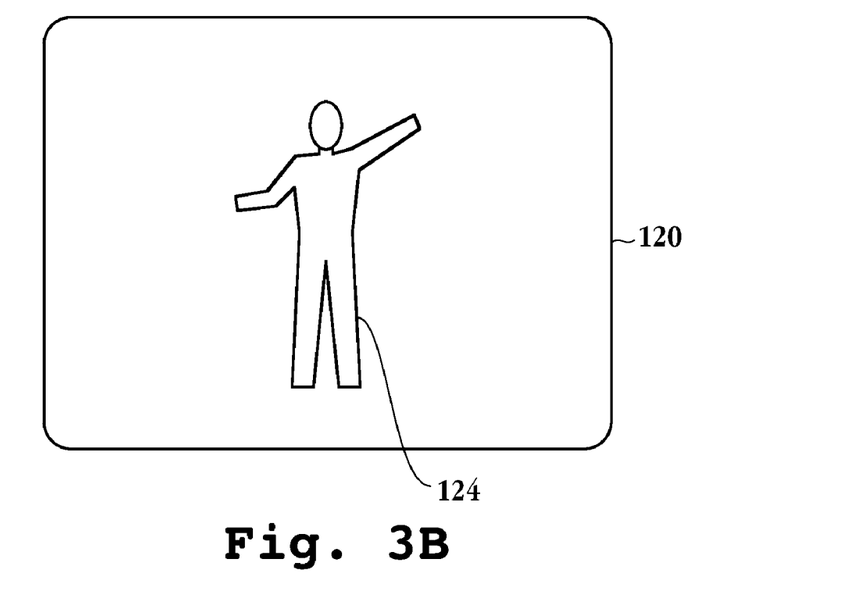

FIGS. 3A and 3B are simplified schematic diagrams illustrating the amount of detail enabled in defining foreground objects in accordance with one embodiment of the invention. FIG. 3A illustrates display screen 120 having a foreground object defined through rectangular region 122. FIG. 3B shows display screen 120 illustrating a foreground object 124 in which a mask has been defined, as described herein, in order to capture the exact outline of the foreground image. That is, with current auto focus, auto gain, backlight compensation techniques, the center of a scene in which an image capture device is targeting, is generally represented as an area and is incapable of outlining the exact image. Thus, as illustrated in FIG. 3A, rectangular region 122 includes the foreground object as well as other image data. Furthermore, the foreground object must be within a center region of the image or the auto focus, auto gain, or backlight compensation features will not work. In contrast, the depth mask captures any foreground object irrespective of its location within the scene. Moreover, the foreground object is captured without any additional image data being included. As mentioned above, for a digital device, the image or video characteristics for any foreground object may be manipulated by adjusting pixel values. With respect to a traditional film camera, the gain, exposure, focus, and brightness may be manipulated through mechanical or electrical adjustments responsive to the depth mask.

Figure 4:
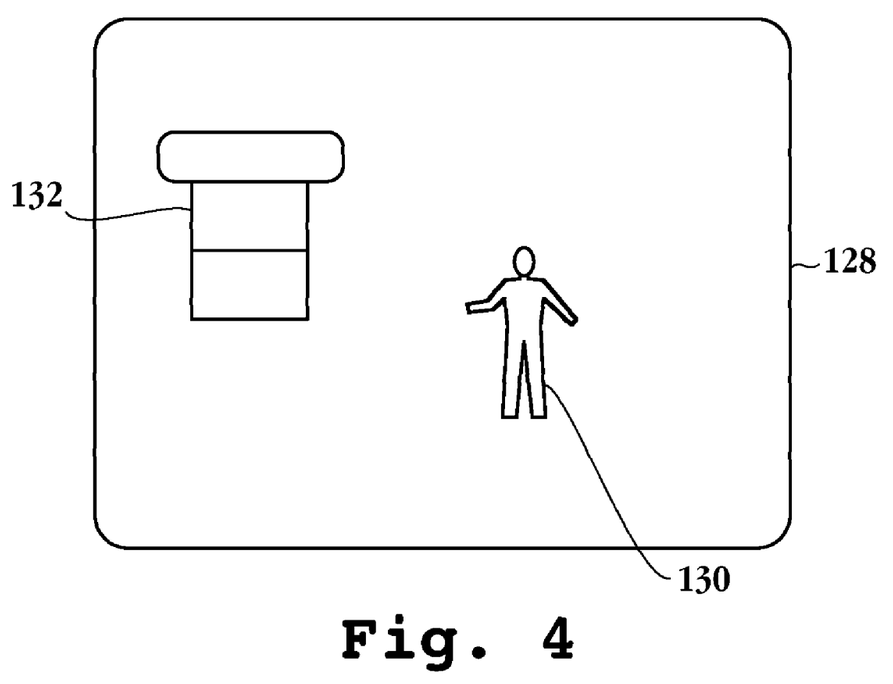
FIG. 4 is a simplified schematic diagram illustrating a captured image which is enhanced through a generated mask to define background and foreground images in accordance with one embodiment of the invention.

FIG. 4 is a simplified schematic diagram illustrating a captured image which is enhanced through a mask generated to define background and foreground images in accordance with one embodiment of the invention. Here, image scene 128 may be a scene captured through an image capture device such as a video cam or a web cam for an interactive gaming application where participant 130 is incorporated into the interactive gaming application. An exemplary interactive gaming application is the EYETOY™ interactive game application. Here, participant 130 is standing in front of a web cam or some other suitable video capture device. Behind participant 130 is window 132. It should be appreciated that where bright light is shining through window 132, the resulting image of participant 130 captured by the image capture device will become darkened. In an interactive video game application where tracking the user is important, the tracking will become difficult where the bright light darkens the image of the user. Thus, where the video cam incorporates the embodiments described herein, the user will be able to be tracked more easily. That is, a mask generated as described above, may be used to manipulate the pixel values to reduce the brightness.

Figure 5:
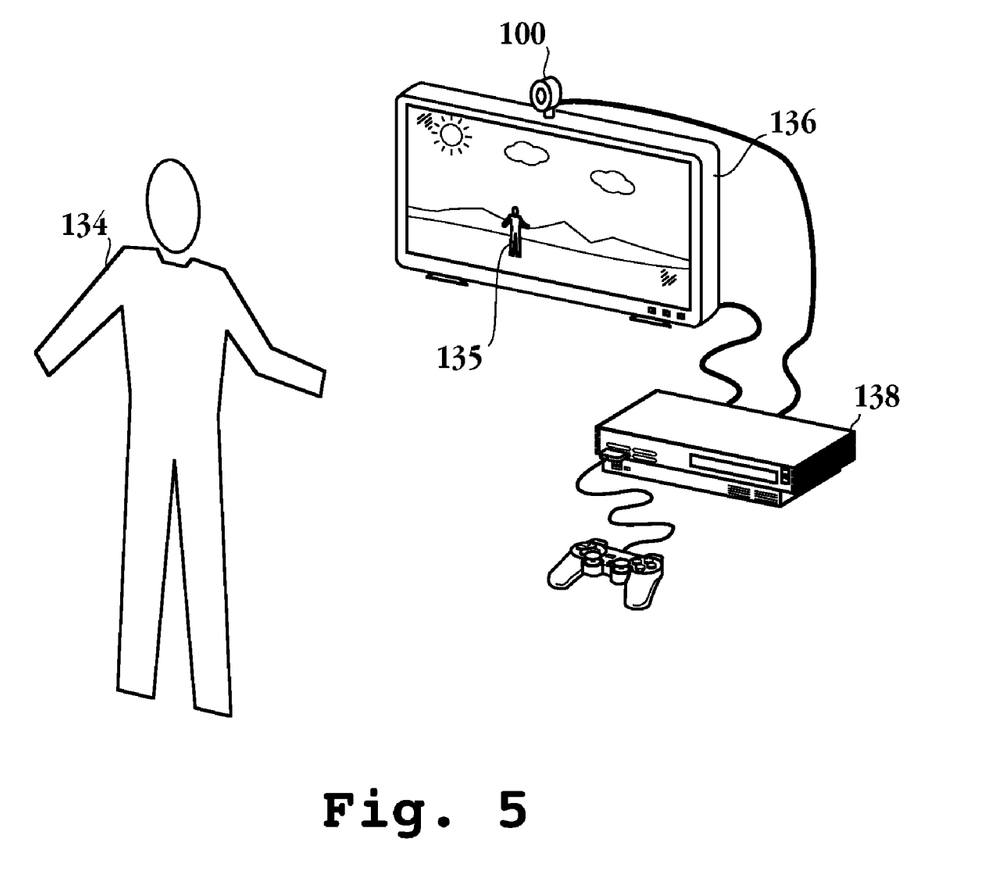
FIG. 5 is a simplified schematic diagram of an interactive entertainment system which utilizes the mask generation in order to more effectively track a user in accordance with one embodiment of the invention.

FIG. 5 is a simplified schematic diagram of an interactive entertainment system which utilizes the generated mask in order to more effectively track a user in accordance with one embodiment of the invention. Here, image capture device 100 is configured to capture an image of user 134 in order for the user's image to be displayed on display screen 136. Image capture device 100 is in communication with computing device 138, which in turn, is in communication with display screen 136. As can be seen, image 135 of user 134 is displayed on display screen 136. Thus, as user 134 moves, this movement is captured through image capture device 100 and displayed on display screen 136 in order to interact with the entertainment application. As mentioned above, the image capture device is configured to compensate for bright light entering through window 132.

Still referring to FIG. 5, image capture device 100 is a video capture device. Here, the pixel data associated with each video frame may be adjusted according to a corresponding depth mask. In one embodiment, a depth mask is generated for each video frame. In another embodiment, the depth mask is generated every x number of frames, where x may be any integer. For the frames not associated with a mask in this embodiment, the image or video characteristics from the last previous frame associated with a mask are applied to the frames not associated with a mask. Thus, the image or video characteristics may be frozen for a certain number of frames until a new mask is generated. It will be apparent to one skilled in the art that the processing for the functionality described herein may be performed by a processor of computing device 138. However, the depth mask may be generated by image capture device 100 and stored in memory of the image capture device. Of course, the image capture device would contain a microprocessor for executing the functionality for generating the depth mask and adjusting the image or video characteristics or adjusting the device parameters.

Image capture device 100 of FIG. 5 may generate the mask through the techniques described with reference to FIG. 2, however, image capture device 100 may alternatively include depth capturing logic, such as 3DV SYSTEM' s ZCAM™ or similar products commercially available through CANESTA™. The depth capturing logic includes an image sensor that captures the depth value of each pixel in a scene in order to create a depth mask to be used as discussed herein. It should be noted that while a single user 134 is depicted in FIG. 5, it should be noted that multiple users may be incorporated in the embodiments described here. Since the depth mask enables adjustment of both foreground and background object image or video characteristics, it is not required that user 134 be located in the middle or any other particular area of the capture region for image captures device 100. It should be further appreciated that one exemplary system represented by FIG. 5 is the EYETOY™ system mentioned above.

Figure 6:
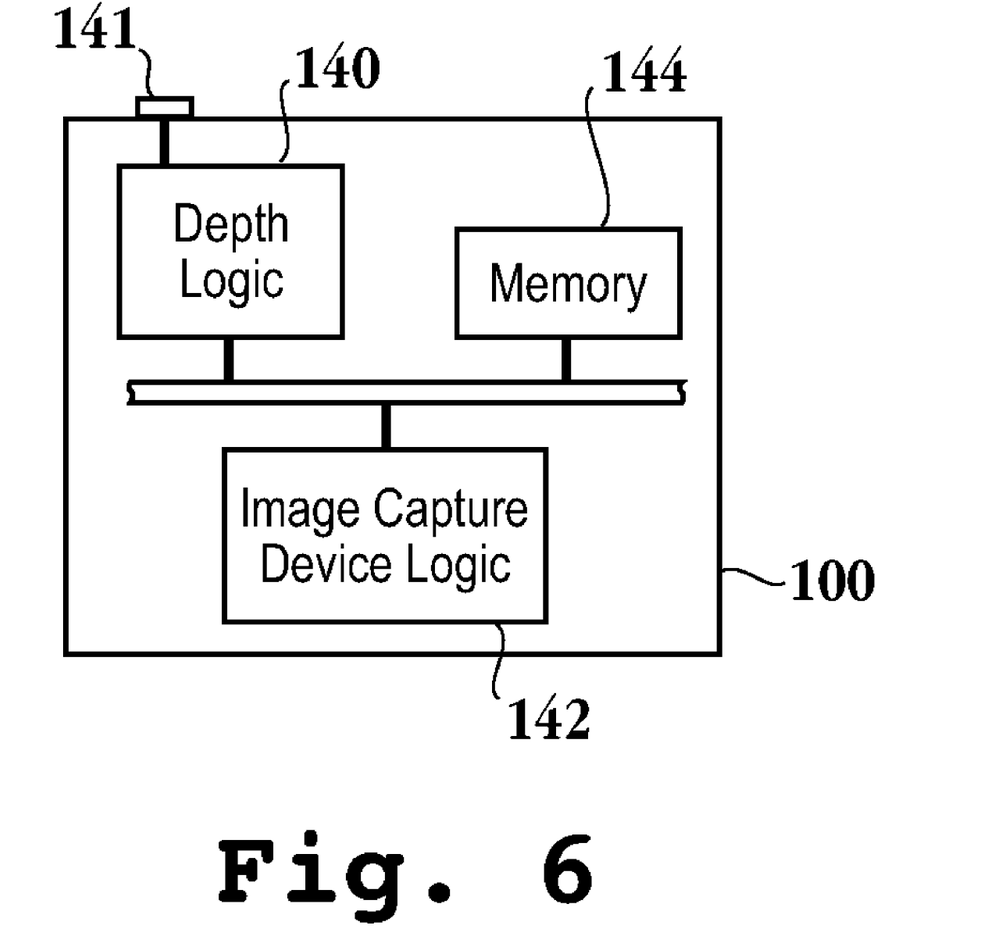
FIG. 6 is a simplified schematic diagram of an image capture device in accordance with one embodiment of the invention.

FIG. 6 is a simplified schematic diagram of an image capture device in accordance with one embodiment of the invention. Image capture device 100 includes depth logic 140, image capture device logic 142, and memory 144 all in communication with each other. As described herein, depth logic 140 includes circuitry configured to generate a mask in order for image capture device 100 to enhance a captured image with the assistance of the depth information. For example, depth logic 140 may generate the mask in order to differentiate between foreground and background objects within an image scene, and this mask will be stored in memory 144. Then, a corresponding scene of the image that is captured and processed by image capture device logic 142 will be enhanced. That is, certain image or video characteristics are manipulated as described herein depending on whether an object within the scene is located in the foreground or background, as determined by the depth mask. In one embodiment, depth logic 140 is activated by button 141 or some other suitable activation mechanism. Thus, a user has the option of activating the depth logic for enhanced image presentation, or bypassing the image presentation.

Figure 7:
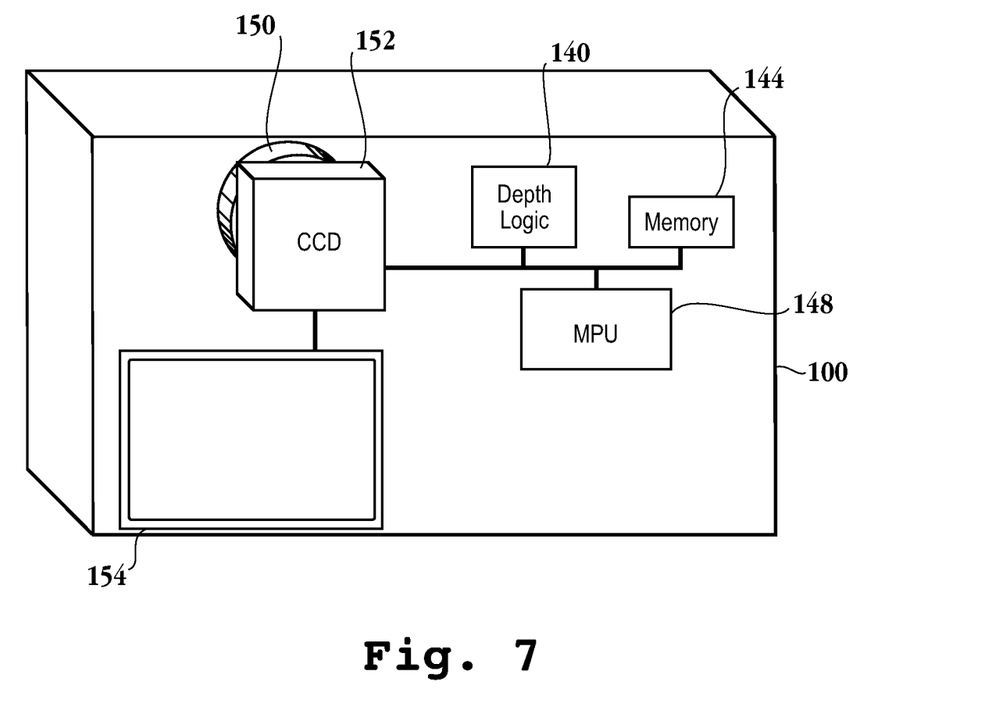
FIG. 7 is an alternative schematic diagram of an image capture device having logic configured to differentiate between foreground and background images in the invention.

FIG. 7 is an alternative schematic diagram of an image capture device having logic configured to differentiate between foreground and background images in the invention. Image capture device 100 includes lens 150 behind which is charged coupled device (CCD) 152. Depth logic 140, microprocessor unit (MPU) 148, and memory 144 are also included. Image capture device 100 includes display panel 154. It will be apparent to one skilled in the art that while image capture device 100 is depicted as a digital camera in FIG. 7, the invention is not limited to a digital camera. Depth logic module 140 may be included in a video capture device in order to adjust image or video characteristics of each frame or every $x^{th}$ frame.

Figure 8:
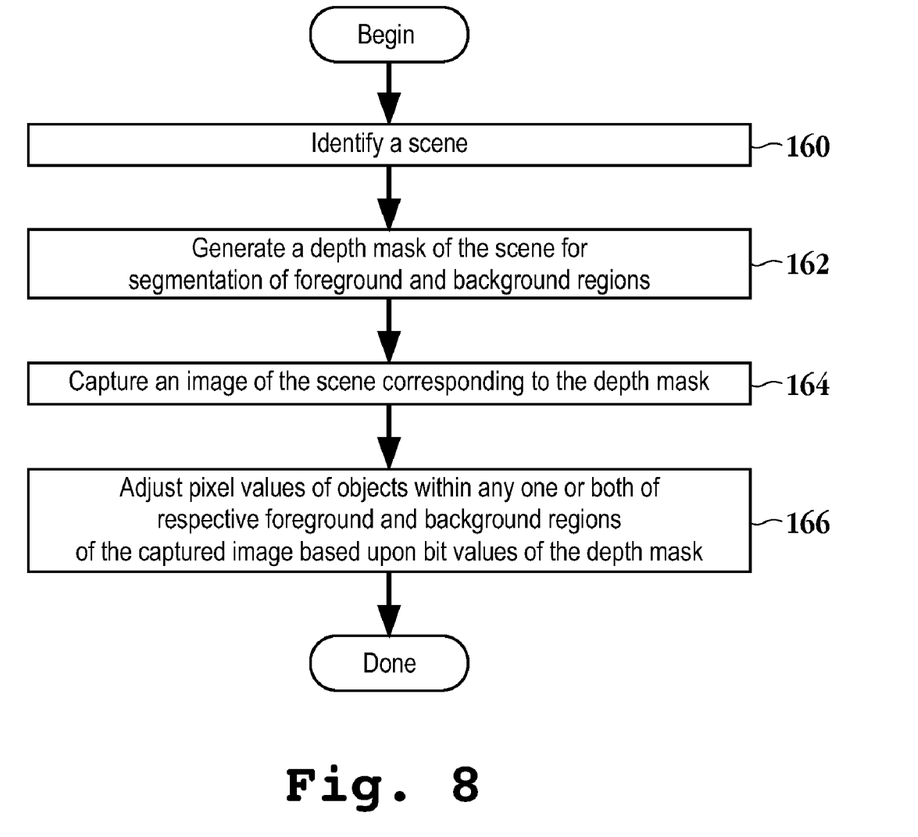
FIG. 8 is a flow chart diagram illustrating the method operations for adjusting image capture settings for an image capture device in accordance with one embodiment of the invention.

FIG. 8 is a flow chart diagram illustrating the method operations for adjusting image capture settings for an image capture device in accordance with one embodiment of the invention. The method initiates with operation 160 where a scene is identified. Here, an image capture device may be used to identify a scene defined by a capture region. Of course, the image capture device may be a video capture device. The method then advances to operation 162 where a depth mask of the scene is generated for segmentation of foreground and background regions. In one embodiment, the depth mask is generated by pulsing light and capturing reflections from an object within a certain distance as described with reference to FIG. 2. Here the light may be infrared light. In another embodiment, the image capture device includes depth logic capable of capturing a depth value for each pixel. One exemplary image capture device with depth logic is the ZCAM™ mentioned above. The method then proceeds to operation 164 where an image of the scene is captured and this captured image corresponds to the depth mask. It should be appreciated that for the ZCAM™ embodiment, operations 162 and 164 are performed simultaneously. The method then moves to operation 166 where pixel values of objects within either, or both, of the foreground and background regions of the captured image are adjusted. This adjustment is based upon the depth mask defined above.

For example, the depth mask may be defined through bit values where a first bit value is assigned to foreground objects and a second bit value is assigned to background objects. The adjustment then enhances the brightness of foreground objects while decreasing the brightness of background objects where a bright light source exists in one embodiment. Where the image capture device is not a digital device, e.g., a SLR camera, mechanical or electrical adjustments of the image capture device parameters may be made as a result of the foreground and background objects identified by the bit mask. These mechanical or electrical adjustments may include defining an aperture size corresponding to a certain exposure level, lens settings for a particular focus level, etc. In another embodiment, the pixel values are adjusted according to depth information included with the image data, i.e., distance information tagged to each pixel of the image data. One skilled in the art will appreciate that the aperture size may be controlled mechanically or electronically. The electronic control may be performed through a sensor on a chip. Thus, each pixel adjusted separately with the electronic control.

In summary, an image capture device capable of generating a depth mask for corresponding segments of a scene is provided. It should be appreciated that while the invention has been described in terms of the background and foreground segments (2 layers) of a scene, the embodiments described herein may be extended to any number of layers of the scene. Through the depth mask, the image or video characteristics for an image may be selectively adjusted irrespective of where an object is located in the scene. Furthermore, the capture device described herein enables enhanced functionality for interactive entertainment applications. For example, with respect to a video game application, where a user is tracked to incorporate his image into the video game, the capture device described above enables for enhanced tracking of the user. The user is free to move anywhere in the capture region and is not limited to one area, such as a center region. Additionally, as the user moves in front of a bright light source, e.g., sunlight coming through a window, the detail of the user's image is not lost. With respect to a video capture device, the adjustments may be applied every interval of frames in order to avoid constant adjustments from occurring. For example, if a user briefly holds up a black piece of paper in front of him, the frame interval delay will prevent the user from suddenly turning darker. Also, if the user temporarily leaves the field of view of the image capture device and comes back, the adjustment and re-adjustment of the scene is avoided.

It should be appreciated that the embodiments described above may be extended to other systems in addition to an interactive entertainment input device, i.e., the EYETOY™ system capture device. For example, the video capture device may be used in a videoconferencing system to provide enhanced video images for the conference. Here, the capture device may not be used for tracking purposes, but for the enhancement of the image or video characteristics enabled through the depth information.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Although the foregoing invention has been described in some detail for purposes of clarity of understanding, it will be apparent that certain changes and modifications may be practiced. Accordingly, the present embodiments are to be considered as illustrative and not restrictive, and the invention is not to be limited to the details given herein, but may be modified within the scope and equivalents of the description.

What is claimed is:

1. A method for adjusting image capture settings for an image capture device, comprising:
   capturing depth information of a scene at the image capture device, the depth information identifying objects at various depths from the image capture device within the scene;
   identifying depth regions of different depths based on the captured depth information;
   adjusting an image capture setting independently for each of the depth regions; and
   performing a single capture of an image of the scene with the image capture device, the image capture device applying the image capture setting of each of the depth regions when the image of the scene is captured;
   wherein the depth information consists of a depth mask, the depth mask containing a plurality of bit values for a plurality of pixels which define the captured image of the scene, each bit value corresponding to one of the depth regions.

2. The method of claim 1, wherein the captured depth information consists of depth values for a plurality of pixels which define the captured image of the scene.

3. The method of claim 1, wherein the identified objects at various depths define the depth regions, the depth regions including one or more foreground regions and a background region.

4. The method of claim 1, further comprising
   capturing successive images of the scene with the image capture device, the image capture device applying the independently adjusted image capture setting, the independent adjustment of the image capture setting being performed at a periodic interval of the successive images of the scene.

5. The method of claim 4, further comprising
   tracking an object within one of the depth regions, the tracking being enhanced by the applied adjusted image capture setting.

6. The method of claim 5, wherein the applied adjusted image capture setting enhances the tracking of the object within the one of the depth regions by reducing brightness of another depth region.

7. The method of claim 1, wherein the image capture setting is selected from the group consisting of gain, exposure, or brightness.

8. The method of claim 1, wherein the independent adjustment of the image capture setting for each depth region is performed according to the bit values of the depth mask.

9. An image capture device, comprising:
- depth capturing logic for capturing depth information of a scene at the image capture device, the depth information identifying objects at various depths from the image capture device within the scene, the depth capturing logic further configured to identify depth regions of different depths based on the captured depth information;
- image capture logic configured to adjust an image capture setting of the image capture device independently for each of the depth regions, and to perform a single capture of an image of the scene, the image capture logic further configured to apply the image capture setting to the capturing of the image of the scene; and
- tracking logic configured to track an object within one of the depth regions;
- wherein the application of the image capture setting enhances the tracking.

10. The image capture device of claim 9, wherein the application of the image capture setting enhances tracking of the object within the one of the depth regions by reducing brightness of another depth region.

11. A method for adjusting frame capture settings for a video capture device, comprising:
- capturing depth information of a scene at the video capture device, the depth information identifying depth regions of different depths based on one or more objects at various depths within the scene;
- adjusting a frame capture setting independently for each of the depth regions; and
- capturing successive frames of the scene with the video capture device, the video capture device applying the frame capture setting of each of the depth regions when each of the successive frames of the scene are captured; and
- tracking an object within one of the depth regions, the tracking being enhanced by the applied adjusted frame capture setting;
- wherein the independent adjustment of the frame capture setting is performed at a periodic interval of the successive frames of the scene.

12. The method of claim 11, wherein the applied adjusted image capture setting enhances the tracking of the object within the one of the depth regions by reducing brightness of another depth region.

13. A method for adjusting image capture settings for an image capture device, comprising:
- capturing depth information of a scene at the image capture device, the depth information identifying objects at various depths from the image capture device within the scene;
- identifying depth regions of different depths based on the captured depth information;
- adjusting an image capture setting independently for each of the depth regions; and
- performing a single capture of an image of the scene with the image capture device, the image capture device applying the image capture setting of each of the depth regions when the image of the scene is captured;
- capturing successive images of the scene with the image capture device, the image capture device applying the independently adjusted image capture setting to each of the successive images of the scene, the independent adjustment of the image capture setting being performed at a periodic interval of the successive images of the scene; and
- tracking an object within one of the depth regions, the tracking being enhanced by the applied adjusted image capture setting.

14. The method of claim 13, wherein the applied adjusted image capture setting enhances the tracking of the object within the one of the depth regions by reducing brightness of another depth region.

* * * * *